Oct. 19, 1948.   R. J. A. BEATTY   2,451,904
LOCATING TOOL
Filed July 15, 1946
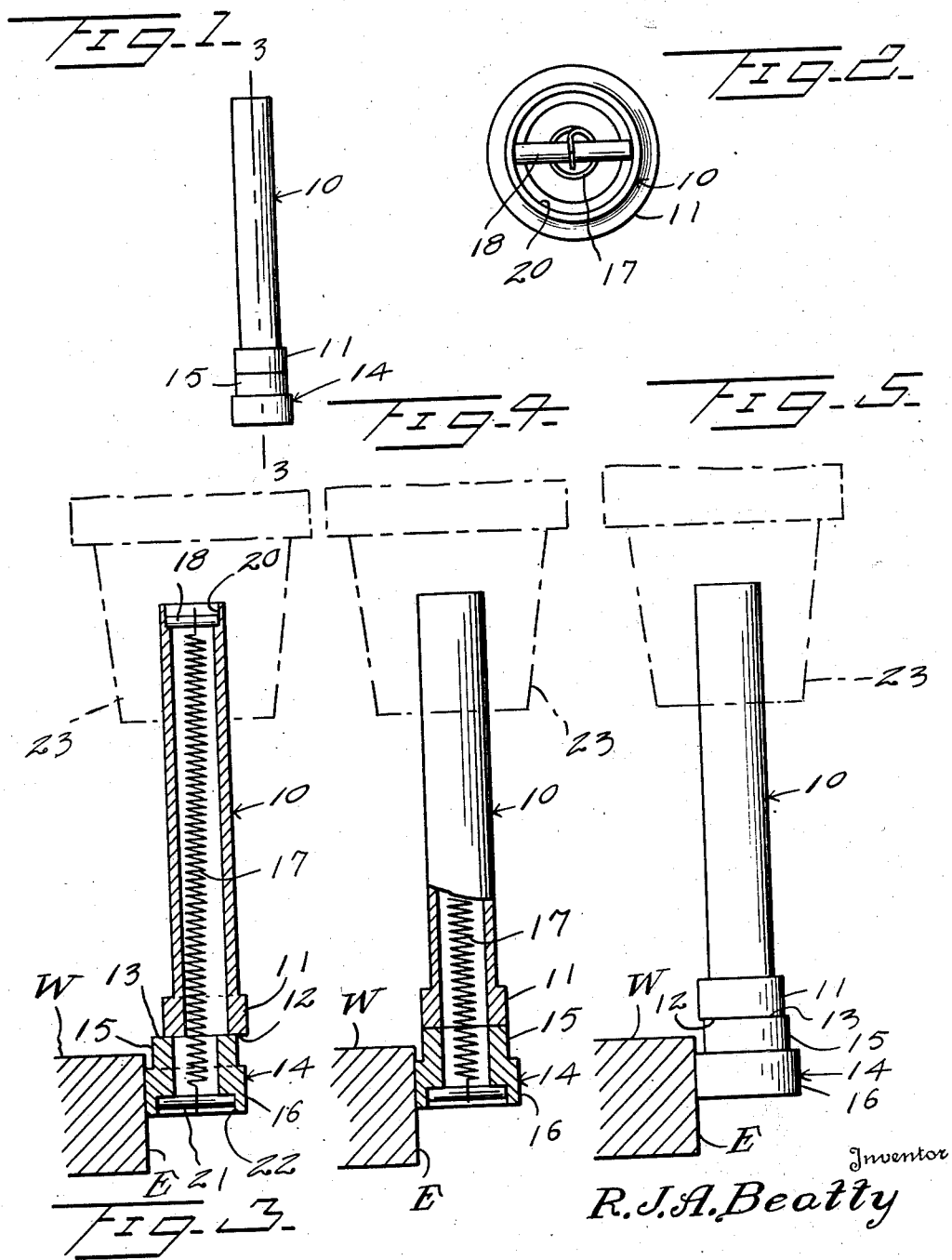
Inventor
R.J.A.Beatty
By Kimmel & Crowell
Attorneys Patented Oct. 19, 1948

2,451,904

UNITED STATES PATENT OFFICE 2,451,904

LOCATING TOOL

Robert James A. Beatty, Dayton, Ohio, assignor to Aero Supply Mfg. Co., Inc., Corry, Pa.

Application July 15, 1946, Serial No. 683,654

1 Claim. (Cl. 33—169)

This invention relates to an improved means for centering or positioning a workpiece relative to the spindle of the machine.

An object of this invention is to provide, in a metal working machine such as a jig borer, vertical mill or the like, an improved positioning means whereby the position of the work relative to the axis of the spindle, chuck or the like can be very accurately and quickly determined.

Another object of this invention is to provide a gauge or locating tool which is of simple construction, and which will eliminate guess work or intricate calculations or operations.

A further object of this invention is to provide a locater or position determining tool whereby the center of the spindle can be located directly over and coinciding with the edge of the work. The edge of the work is then used as a reference for locating holes, slots, grooves and other machining or inspection operations. These locations are made with the use of graduated dials, reference blocks, or other measuring equipment on the machine.

With the above and other objects in view, my invention consists in the arrangement, combination and details of construction disclosed in the drawings and specification, and then more particularly pointed out in the appended claim.

In the drawings, wherein similar reference characters designate similar parts throughout the respective views, Figure 1 is a detail side elevation of a workpiece centering or positioning member, Figure 2 is an inner end elevation of the device, Figure 3 is a longitudinal section, taken substantially on the line 3—3 of Figure 1, showing the initial centering operation between the chuck and the workpiece, Figure 4 is a view similar to Figure 3, showing the device in properly centered position, Figure 5 is a view similar to Figure 3, wherein the workpiece is bearing against the movable portion of the device, forcibly moving the movable portion off center.

Referring to the drawing, the numeral 10 designates generally an elongated sleeve or tubular member which is formed with an enlarged outer end portion 11. The outer end portion 11 is squared off as indicated at 12, and the rear or inner end 13 of a centering member or disc, generally designated as 14, bears against the precision outer end of the shank or tubular member 10. The disc or centering member 14 is formed of a reduced diameter inner portion 15 and a larger diameter outer portion 16. The diameter of the reduced portion 15 is precision ground to conform to the outer diameter of the enlarged outer end portion 11 of the shank. The disc or center indicating member 14 is yieldably coupled and held on the outer end of the shank or tubular member 10 by means of an elongated spring 17.

The spring 17, at its inner end, engages over a pin 18 which is mounted in a counterbore 20 formed in the inner end of the shank, and the outer end of the spring 17 engages over a pin 21 disposed in the counterbore 22 which is formed in the outer end of the centering member 14. The spring 17 maintains the disc or centering member 14 in end abutting relation with respect to the precision ground outer end 12 of the shank 10.

In the use and operation of this centering device, the shank 10 is secured in a chuck or collet 23 which is mounted on a jig borer, vertical mill, or other machine. The head or disc 14 is disposed in the position for engagement with the inner end of the workpiece W. When the chuck 23 is rotated at a speed of four hundred or more revolutions per minute, the centering member 14 will, by centrifugal force, be moved off center with respect to the longitudinal center of the shank 10. The spring 17 will, however, hold the head 14 firmly against the outer end of the shank.

The head or centering member 14 will describe an orbit as it is rotated and will strike the inner end or edge E of the workpiece W. As the workpiece W is directed inwardly toward the center of the shank 10, the head 14 will have the orbit thereof reduced until the center of the head 14 is coaxial with the axis of the shank 10, as shown in Figure 4. At this time the enlarged outer end 11 of the shank 10 will be flush with the reduced inner end portion 15 of the head 14. However, as it is practically impossible to determine when the head 14 is coaxial with the shank 10, the workpiece W is moved inwardly an additional distance which may be finely regulated by the adjusting screw of the carriage so that the workpiece W will forcibly shift the disc 14 off center as shown in Figure 5.

By checking the distance traveled from the time the disc 14 appears coaxial with the shank 10 (Fig. 4) until it is on position Fig. 5 or eccentric with shank 10 it will be found, if an indicator graduated in .0001 inch is used for checking the travel, the distance will vary, but never over .0002 of an inch. Therefore, from the position in Fig. 4 to Fig. 5 the disc will break from true to eccentric within .0002 of an inch. This is the important part of the tool or its indicating feature and the operator or user need never check this feature again as it will consistently repeat.

The advantage of this device is that locations of holes, slots, grooves, or other machining or inspection operations to be performed, or which have been performed on the workpiece W, may be very quickly and reliably determined with great accuracy and without the use of expensive or fragile instruments.

I do not mean to confine myself to the exact details of construction herein disclosed, but claim all variations falling within the purview of the appended claim.

What I desire to claim is:

A centering tool for a metal working machine comprising an elongated shank having an axial bore therethrough and a concentric counterbore at the inner end thereof, said shank including a concentric annular enlargement at the outer end thereof, said enlargement having a precision ground peripheral surface and a precision ground outer end, a head formed with a precision ground inner end bearing against the outer end of said enlargement and having an outer diameter equal to the outer diameter of said enlargement, said head including a concentric workpiece engaging outer part of a diameter greater than the diameter of the inner part thereof, said head having a concentric axial bore and a coaxial counterbore extending inwardly from the outer end thereof, a spring disposed in the bore of said shank and head, and a pair of spring tensioning pins disposed one in each counterbore and engaging said spring whereby to yieldably hold said shank and head together.

ROBERT JAMES A. BEATTY.

REFERENCES CITED

The following references are of record in the file of this patent:

UNITED STATES PATENTS

| Number | Name | Date |
|---|---|---|
| 1,252,777 | Casler | Jan. 8, 1918 |
| 1,984,864 | Cole et al. | Dec. 18, 1934 |

OTHER REFERENCES

Publ.: "Machinery," magazine, January 1925, page 394.